(12) United States Patent
Bainbridge

(10) Patent No.: US 7,321,321 B2
(45) Date of Patent: Jan. 22, 2008

(54) DECODING OF A RESTRICTED M-OF-N CODE

(75) Inventor: William John Bainbridge, Manchester (GB)

(73) Assignee: Silistix UK Limited, London (GB)

( * ) Notice: Subject to any disclaimer, the term of this patent is extended or adjusted under 35 U.S.C. 154(b) by 406 days.

(21) Appl. No.: 11/139,178

(22) Filed: May 27, 2005

(65) Prior Publication Data

US 2005/0276346 A1 Dec. 15, 2005

Related U.S. Application Data

(63) Continuation of application No. PCT/GB03/05136, filed on Nov. 26, 2003.

(30) Foreign Application Priority Data

Nov. 29, 2002 (GB) .................................. 0227841.4

(51) Int. Cl.
*H03M 7/00* (2006.01)
(52) U.S. Cl. ................ 341/82; 341/102; 341/103
(58) Field of Classification Search ................ 341/82, 341/102, 103
See application file for complete search history.

(56) References Cited

U.S. PATENT DOCUMENTS

| | | | |
|---|---|---|---|
| 4,498,177 A | 2/1985 | Larson | |
| 5,173,694 A * | 12/1992 | Lynch et al. | 341/59 |
| 5,272,461 A | 12/1993 | Zojer | |
| 6,370,559 B1 * | 4/2002 | Hoffman | 708/625 |
| 6,480,984 B1 * | 11/2002 | Aziz | 714/795 |
| 6,579,297 B2 * | 6/2003 | Bicek et al. | 606/108 |
| 6,751,774 B2 * | 6/2004 | Aziz | 714/792 |
| 6,768,432 B2 * | 7/2004 | Schouhamer Immink | 341/102 |
| 6,771,195 B2 * | 8/2004 | Kahlmann | 341/102 |
| 6,812,870 B1 * | 11/2004 | Kryzak et al. | 341/95 |
| 2005/0219077 A1 * | 10/2005 | Zhang | 341/51 |

FOREIGN PATENT DOCUMENTS

DE 24 03 392 7/1975

* cited by examiner

*Primary Examiner*—Linh Nguyen
(74) *Attorney, Agent, or Firm*—Jeffer Mangels Butler & Marmaro LLP

(57) ABSTRACT

A method for communication between a sender and a receiver, including receiving data in the form of an M-of-N code, where the M-of-N code includes a first component of length $n_1$ and a second component of length $n_2$; decoding data in which the first component is an $m_1$-of-$n_1$ code and the second component is an $m_2$-of-$n_2$ code; and decoding data in which the first component is an $m_3$-of-$n_1$ code where $m_1 \neq m_3$ and the second component is an $m_4$-of-$n_2$ code where $m_2 \neq m_4$.

14 Claims, 5 Drawing Sheets

DECODING OF A RESTRICTED M-OF-N CODE

CLAIM OF PRIORITY UNDER 35 U.S.C. §120

The present Application for Patent is a continuation of PCT Application No. PCT/GB2003/005136, entitled "DECODING OF A RESTRICTED M-OF-N CODE," with an international filing date of Nov. 26, 2003, pending, which claims priority to GB Application No. 0227841.4, entitled "COMMUNICATION METHOD," filed Nov. 29, 2002, both of which are assigned to the assignee hereof and hereby expressly incorporated by reference herein.

BACKGROUND

1. Field

The present invention relates to a method of communication suitable for use in a digital electronics system. The method is particularly but not exclusively suitable for communication between components within a computer chip, or between discrete components on a circuit board.

2. Background

Delay insensitive communication is an attractive communication method in which data can be correctly received even if delays occur during its communication. Delay insensitive communication is particularly applicable in asynchronous systems. Although many possible delay insensitive coding techniques exist, very few of these can be efficiently implemented in complementary metal-oxide semiconductor (CMOS) logic design.

A popular form of delay insensitive coding is the so called "m-of-n" code, where communication is carried out using an n bit binary word, and all valid communication values have m bits set to a predetermined value. Using an m-of-n code, a receiver knows that communication is complete (a process known as completion detection) when but only when m bits set to the predetermined value have been received (receipt of more than m bits is considered a violation of a precondition and is not catered to by the logic). An example of an m-of-n code is dual rail encoding (a 1-of-2 code), where each bit of data is encoded using first and second coded bits. The first coded bit is set to '1' if the value to be encoded is '0' while the second coded bit is set to '1' is the value to be encoded is a '1.' Dual rail systems are relatively straightforward to implement, although relatively inefficient.

The use of 1-of-4 codes for data communication has recently been proposed. A 1-of-4 code allows two bits to be transmitted using a single signal transition, that is two bits can be represented using exactly half the number of signals required by a dual rail encoding.

Efficiency of an m-of-n code can be defined by two metrics, rate R, and redundancy r which are defined by the following equations:

$$R = \frac{\log_2 m_s}{n} \quad (1)$$

$$r = n - \log_2 m_s \quad (2)$$

where $m_s$ is the number of discrete data symbols which can be represented by the code.

It is desirable to maximize rate, while minimizing redundancy. From equations (1) and (2) it can be deduced that a dual rail code has a rate of 0.5 and a redundancy of 1, while a 1-of-4 code has a rate of 0.5 and a redundancy of 2. However, the reduction of signal transitions required by a 1-of-4 code may render its use preferable in cases where power consumption is to be minimized.

In general terms, 1-of-n codes (which are a subset of m-of-n codes) are particularly easy to implement, given that completion detection can be carried out by using a straightforward OR function of all bits of the word. Thus 1-of-n codes are often used for delay insensitive communication. However, it should be noted that the efficiency of codes in which n is greater than four decreases considerably.

While using codes with a larger m value can improve rate and redundancy, (a 2-of-4 code allows six values to be represented and, from equations (1) and (2), has a rate of 0.65 and a redundancy of 1.412), the complexity of the required logic circuits is considered to be too expensive.

It is an object of the present invention to provide an improved coding method.

SUMMARY OF THE PREFERRED EMBODIMENTS

According to the present invention there is provided a method for communication between a sender and a receiver, wherein:

the sender transmits data in the form of an M-of-N code to the receiver;

the M-of-N code is considered as comprising a first component of length $n_1$ and a second component of length $n_2$; and the receiver is provided with means for decoding data in which the first component is an $m_1$-of-$n_1$ code and the second component is an $m_2$-of-$n_2$ code, and for decoding data in which the first component is an $m_3$-of-$n_1$ code where $m_1 \neq m_3$ and the second component is an $m_4$-of-$n_2$ code where $m_2 \neq m_4$.

The term m-of-n code is used herein to mean an n bit binary number, each bit of which has first and second selectable states and m bits of which are set to the first selectable state.

The inventors of the present application have realized that by decomposing a relatively large M-of-N code into at least two relatively smaller m-of-n codes in at least two different ways, the number of symbols which can be represented by the code increases beyond that which can be represented by a straightforward concatenation of two smaller codes, while the complexity of logic required to implement the code remains acceptable.

In some embodiments of the invention, $n_1+n_2=N$, and $m_1+m_2=m_3+m_4=M$. At least one of the first and second components may be considered as comprising first and second sub-components and the receiver may be provided with means for decoding data in which the first sub-component is a $p_1$-of-$q_1$ code and the second sub-component is a $p_2$-of-$q_2$ code, and for decoding data in which the first sub-component is a $p_3$-of-$q_1$ code where $p_1 \neq p_3$ and the second sub-component is a $p_4$-of-$q_2$ code where $P_2 \neq p_4$. At least one of $m_1$ and $m_2$ may be 1.

The M-of-N code may be an encoding of a binary value. The binary value may be encoded by representing the binary value as a plurality of $m_1$-of-$n_1$ codes, the plurality of codes being input to a bitwise logical OR function, the output of the logical OR function being the first component of the M-of-N code, and the second component being determined in dependence upon the difference, if any, between the plurality of $m_1$-of-$n_1$ codes. The binary value may be represented as two $m_1$-of-$n_1$ codes, equality between the two $m_1$-of-$n_1$ codes may result in the first component of the M-of-N code being an $m_1$-of-$n_1$ code and the second component of the M-of-N code being an $m_2$-of-$n_2$ code, and inequality between the two $m_1$-of-$n_1$ codes may result in the first component of the binary number being an $m_3$-of-$n_1$ code and the second component of the binary number being an $m_4$-of-$n_2$ code.

The sender and receiver may be located within a single silicon chip, or alternatively the sender and receiver may be located on different silicon chips.

A plurality of data items may be transmitted by the sender to the receiver, and data may be transmitted via a buffer positioned between the sender and the receiver, such that a first data item is transmitted from the buffer to the receiver, while a second data item is transmitted from the sender to the buffer.

According to the present invention there is also provided a communications apparatus comprising a sender, a receiver and transmission means at the sender for transmitting data in the form of a binary number representing an M-of-N code to the receiver, wherein the binary number is considered as comprising a first component of length $n_1$ and a second component of length $n_2$, and the receiver comprises means for receiving decoding data in which the first component is an $m_1$-of-$n_1$ code and the second component is an $m_2$-of-$n_2$ code, and for receiving and decoding data in which the first component is an $m_3$-of-$n_1$ code where $m_1 \neq m_3$ and the second component is an $m_4$-of-$n_2$ code where $m_2 \neq m_4$.

Other objects, features and advantages of the present invention will become apparent to those skilled in the art from the following detailed description. It is to be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

Embodiments of the present invention will now be described, by way of example, with reference to the accompanying drawings, in which.

Like numerals refer to like parts throughout the several views of the drawings.

DETAILED DESCRIPTION OF THE PREFERRED EMBODIMENTS

Figure 1:
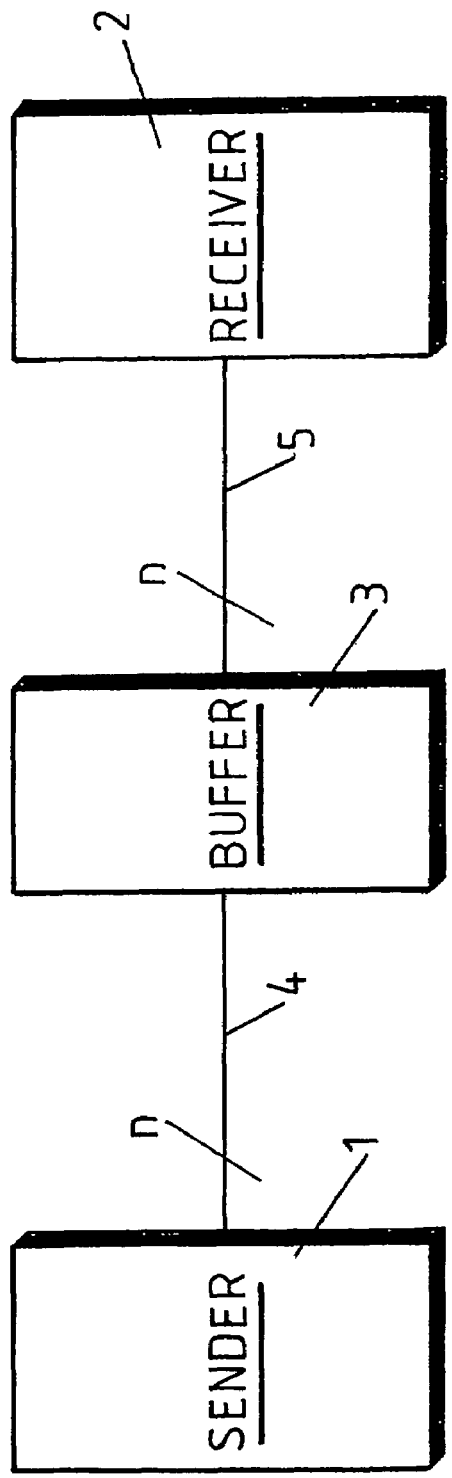
FIG. 1 is a schematic illustration of communication between a sender and a receiver via a buffer.

Referring to FIG. 1, there is illustrated a sender 1 in communication with a receiver 2 via a buffer 3. The sender is connected to the buffer by a first connection 4, while the buffer is connected to the receiver by a second connection 5. The first and second connections 4, 5 are each n bit connections, and communication between the sender 1, the buffer 3 and the receiver 2 is carried out using m-of-n codes. The presence of the buffer between the sender 1 and the receiver 2 allows the connection between the sender and the receiver to be "pipelined." That is, a first data item can be in transit between the buffer 3 and the receiver 2 while a second data item is in transit between the sender 1 and the buffer 3. This improves the throughput of the communications channel between the sender 1 and the receiver 2 thereby reducing delays in communication.

A binary number of predetermined length that represents an M-of-N code can be divided into two or more component binary numbers, each of which is itself considered as an m-of-n code. The number of symbols that can be represented by such a binary number will be the product of the number of symbols that can be represented by each component code individually. For example, if a seven-bit binary number representing a 2-of-7 code is treated as a 1-of-4 code and a 1-of-3 code, twelve (4×3) symbols can be represented. However, given that computer hardware communication works using the binary number system, the number of symbols used must be a power of two. Thus, using this system only eight symbols (a three bit binary value) can be represented. This is shown in table 1.

TABLE 1

| SEVEN BIT CODE | | |
|---|---|---|
| 1 of 3 | 1 of 4 | BINARY |
| 1 0 0 | 0 0 0 1 | 0 0 0 |
| 1 0 0 | 0 0 1 0 | 0 0 1 |
| 1 0 0 | 0 1 0 0 | 0 1 0 |
| 1 0 0 | 1 0 0 0 | 0 1 1 |
| 0 1 0 | 0 0 0 1 | 1 0 0 |
| 0 1 0 | 0 0 1 0 | 1 0 1 |
| 0 1 0 | 0 1 0 0 | 1 1 0 |
| 0 1 0 | 1 0 0 0 | 1 1 1 |
| 0 0 1 | 0 0 0 1 | UNUSED |
| 0 0 1 | 0 0 1 0 | UNUSED |
| 0 0 1 | 0 1 0 0 | UNUSED |
| 0 0 1 | 1 0 0 0 | UNUSED |

The present invention is concerned with improving the number of symbols that can be represented by such a code. This is achieved by allowing the use of two different code pairs within the encoding method.

In accordance with the invention, the seven-bit binary number is considered as comprising a 1-of 3 code and a 1-of-4 code or a 0-of-3 code and a 2-of-4 code. That is, the overall code is always a 2-of-7 code. Using this scheme, an additional four symbols can be represented, such that the code can represent eighteen different symbols. Thus, the code can be used to encode a four-bit binary value (sixteen values), with two code values remaining unused. The values which are unused are selected such that the 2-of-4 code may be further decomposed into two dual rail (1-of-2) codes. This is illustrated in table 2.

TABLE 2

| | 2-of 4 | | |
|---|---|---|---|
| 1-of-3 | 1-of-2 | 1-of-2 | Binary Value |
| 1 0 0 | 0 0 | 0 1 | 1 1 0 0 |
| 1 0 0 | 0 0 | 1 0 | 1 1 0 1 |
| 1 0 0 | 0 1 | 0 0 | 1 1 1 0 |
| 1 0 0 | 1 0 | 0 0 | 1 1 1 1 |
| 0 1 0 | 0 0 | 0 1 | 1 0 0 0 |

TABLE 2-continued

| | 2-of 4 | | |
|---|---|---|---|
| 1-of-3 | 1-of-2 | 1-of-2 | Binary Value |
| 0 1 0 | 0 0 | 1 0 | 1 0 0 1 |
| 0 1 0 | 0 1 | 0 0 | 1 0 1 0 |
| 0 1 0 | 1 0 | 0 0 | 1 0 1 1 |
| 0 0 1 | 0 0 | 0 1 | 0 1 0 0 |
| 0 0 1 | 0 0 | 1 0 | 0 1 0 1 |
| 0 0 1 | 0 1 | 0 0 | 0 1 1 0 |
| 0 0 1 | 1 0 | 0 0 | 0 1 1 1 |
| 0 0 0 | 1 0 | 0 1 | 0 0 1 0 |
| 0 0 0 | 1 0 | 1 0 | 0 0 1 1 |
| 0 0 0 | 0 1 | 0 1 | 0 0 0 0 |
| 0 0 0 | 0 1 | 1 0 | 0 0 0 1 |
| 0 0 0 | 1 1 | 0 0 | UNUSED |
| 0 0 0 | 0 0 | 1 1 | UNUSED |

Figure 2:
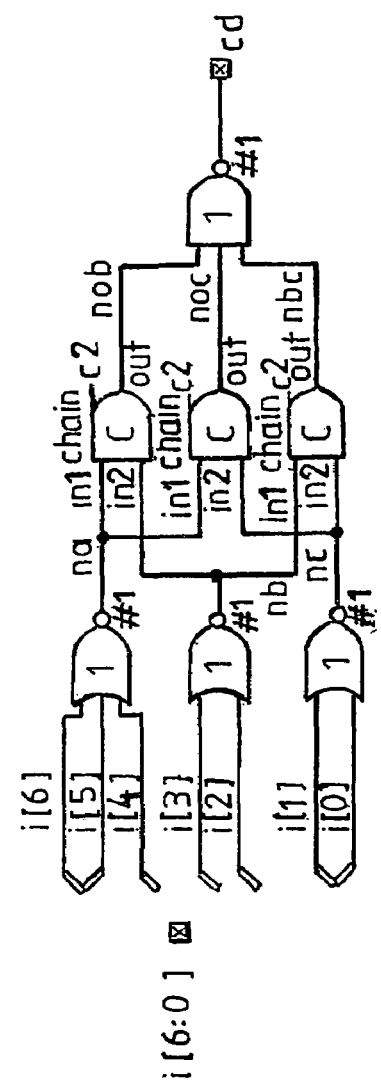
FIG. 2 is a circuit diagram showing completion detection logic for a seven-bit binary number treated in accordance with the present invention.

As can be seen from table 2, each valid code used to represent a binary value comprises a single '1' value in exactly two of the three component codes. This means that completion detection can be carried out in a straightforward manner by performing an OR operation on the bits of each component, and inputting the outputs of these OR operations to an operation which ensures that two of the three OR operations return true. Suitable completion detection logic is illustrated in FIG. 2. It should be noted that in FIG. 2, the bits of each component are input to a NOR operation, and this negation is corrected by the presence of a NAND gate at the output of the circuit. Other suitable implementations of the completion detection logic will be readily apparent to those skilled in the art.

Thus, in accordance with the invention, a restricted 2-of-7 code is used, which improves the rate and redundancy over and above that which is achievable with a simple decomposition into a 1-of-3 code and a 1-of-4 code while retaining the complexity of the logic design at an acceptable level. The described code has a rate of 0.57 and a redundancy of 3.

An alternative example of an encoding using the method of the present invention uses a 3-of-6 code. A complete 3-of-6 code can represent 20 discrete symbols, and it would therefore be desirable for a 3-of-6 code to be considered to comprise components formed such that at least 16 symbols (and therefore a four bit binary number) can be represented. In the present example, the first component comprises two bits and the second component comprises four bits.

A method for mapping 4-bit binary values to valid 3-of-6 code values is now described. In order to conveniently match four bit binary values to values in the code, each two bit binary value is allocated to a 1-of-4 code as follows:

TABLE 3

| Binary | 1-of-4 |
|---|---|
| 0 0 | 0 0 0 1 |
| 0 1 | 0 0 1 0 |
| 1 0 | 0 1 0 0 |
| 1 1 | 1 0 0 0 |

Thus, the sixteen four bit binary values are represented by the following codes

TABLE 3A

| | 2 1-of-4 codes | |
|---|---|---|
| Binary | A | B |
| 0 0 0 0 | 0 0 0 1 | 0 0 0 1 |
| 0 0 0 1 | 0 0 0 1 | 0 0 1 0 |
| 0 0 1 0 | 0 0 0 1 | 0 1 0 0 |
| 0 0 1 1 | 0 0 0 1 | 1 0 0 0 |
| 0 1 0 0 | 0 0 1 0 | 0 0 0 1 |
| 0 1 0 1 | 0 0 1 0 | 0 0 1 0 |
| 0 1 1 0 | 0 0 1 0 | 0 1 0 0 |
| 0 1 1 1 | 0 0 1 0 | 1 0 0 0 |
| 1 0 0 0 | 0 1 0 0 | 0 0 0 1 |
| 1 0 0 1 | 0 1 0 0 | 0 0 1 0 |
| 1 0 1 0 | 0 1 0 0 | 0 1 0 0 |
| 1 0 1 1 | 0 1 0 0 | 1 0 0 0 |
| 1 1 0 0 | 1 0 0 0 | 0 0 0 1 |
| 1 1 0 1 | 1 0 0 0 | 0 0 1 0 |
| 1 1 1 0 | 1 0 0 0 | 0 1 0 0 |
| 1 1 1 1 | 1 0 0 0 | 1 0 0 0 |

By using a bitwise logical OR operation on each pair of codes in the right hand column of table 3A, the 4 bit component of the 3-of-6 code which is to be used for communication is generated. Thus:

TABLE 4

| Binary | 4-bit component |
|---|---|
| 0 0 0 0 | 0 0 0 1 |
| 0 0 0 1 | 0 0 1 1 |
| 0 0 1 0 | 0 1 0 1 |
| 0 0 1 1 | 1 0 0 1 |
| 0 1 0 0 | 0 0 1 1 |
| 0 1 0 1 | 0 0 1 0 |
| 0 1 1 0 | 0 1 1 0 |
| 0 1 1 1 | 1 0 1 0 |
| 1 0 0 0 | 0 1 0 1 |
| 1 0 0 1 | 0 1 1 0 |
| 1 0 1 0 | 0 1 0 0 |
| 1 0 1 1 | 1 1 0 0 |
| 1 1 0 0 | 1 0 0 1 |
| 1 1 0 1 | 1 0 1 0 |
| 1 1 1 0 | 1 1 0 0 |
| 1 1 1 1 | 1 0 0 0 |

It will be appreciated that the code shown in table 4 does not contain enough information to correctly represent all sixteen symbols because, for example, the codes representing binary values of 0010 and 1000 are the same. These values must be differentiated by the two-bit component of the 3-of-6 code. One convenient way of providing this differentiation involves the observation that in all cases the two 1-of-4 codes A, B are either equal, or A is greater than B, or B is greater than A. In the first of these cases, the resulting 4-bit component will be a 1-of-4 code, and the 2-bit component must therefore provide two bits to the overall code to generate a 3-of-6 code. Thus the 2-bit component must have the value 11. If A is greater than B then two-bit component has a value of 01, while if B is greater than A, the two-bit component has a value of 10. This is shown in table 5.

TABLE 5

3-of 6

| 2-bit Component | 4-bit Component | Binary Value |
| --- | --- | --- |
| 0 1 | 0 0 1 1 | 0 1 0 0 |
| 0 1 | 0 1 0 1 | 1 0 0 0 |
| 0 1 | 0 1 1 0 | 1 0 0 1 |
| 0 1 | 1 0 0 1 | 1 1 0 0 |
| 0 1 | 1 0 1 0 | 1 1 0 1 |
| 0 1 | 1 1 0 0 | 1 1 1 0 |
| 1 0 | 0 0 1 1 | 0 0 0 1 |
| 1 0 | 0 1 0 1 | 0 0 1 0 |
| 1 0 | 0 1 1 0 | 0 1 1 0 |
| 1 0 | 1 0 0 1 | 0 0 1 1 |
| 1 0 | 1 0 1 0 | 0 1 1 1 |
| 1 0 | 1 1 0 0 | 1 0 1 1 |
| 1 1 | 0 0 0 1 | 0 0 0 0 |
| 1 1 | 0 0 1 0 | 0 1 0 1 |
| 1 1 | 0 1 0 0 | 1 0 1 0 |
| 1 1 | 1 0 0 0 | 1 1 1 1 |

The restricted 3-of-6 code shown in table 5 exhibits improved rate and redundancy characteristics as compared with a conventional decomposition into two smaller components (e.g., a 1-of-2 code and a 2-of-4 code) while retaining logic complexity at an acceptable level.

A further four symbols can be represented by allowing the two-bit component to be a 0-of-2 code and the four bit component to be a 3-of-4 code. Thus, a complete 3-of-6 code is formed. These additional symbols add some complexity to the logic, but allow the code to transmit sixteen data values while providing some additional symbols for the communication of control values. This addition to the code is shown in table 6 below.

TABLE 6

3-of-6

| 2-bit Component | 4-bit Component | Binary Value |
| --- | --- | --- |
| 0 0 | 0 1 1 1 | |
| 0 0 | 1 0 1 1 | |
| 0 0 | 1 1 0 1 | 0 1 0 0 |
| 0 0 | 1 1 1 0 | 1 0 0 0 |
| 0 1 | 0 0 1 1 | 1 0 0 1 |
| 0 1 | 0 1 0 1 | 1 1 0 0 |
| 0 1 | 0 1 1 0 | 1 1 0 1 |
| 0 1 | 1 0 0 1 | 1 1 1 0 |
| 0 1 | 1 0 1 0 | 0 0 0 1 |
| 0 1 | 1 1 0 0 | 0 0 1 0 |
| 1 0 | 0 0 1 1 | 0 1 1 0 |
| 1 0 | 0 1 0 1 | 0 0 1 1 |
| 1 0 | 0 1 1 0 | 0 1 1 1 |
| 1 0 | 1 0 0 1 | 1 0 1 1 |
| 1 0 | 1 0 1 0 | 0 0 0 0 |
| 1 0 | 1 1 0 0 | 0 1 0 1 |
| 1 1 | 0 0 0 1 | 1 0 1 0 |
| 1 1 | 0 0 1 0 | 1 1 1 1 |
| 1 1 | 0 1 0 0 | |
| 1 1 | 1 0 0 0 | |

Referring to table 6, the first four rows of the table show code values which are used to represent control data, and do not therefore represent a four-bit value. Rows five to nine represent binary values which are represented by the combination of two 1-of-4 codes where A is greater than B, rows ten to thirteen represent binary values which are represented by the combination of two 1-of-4 codes where B is greater than A, and the final four rows of the table represent binary values created by the combination of identical 1-of-4 codes, i.e. A=B.

The 3-of-6 code described above in both tables 5 and 6 has a rate of 0.67 and a redundancy of 2.

Figure 3:
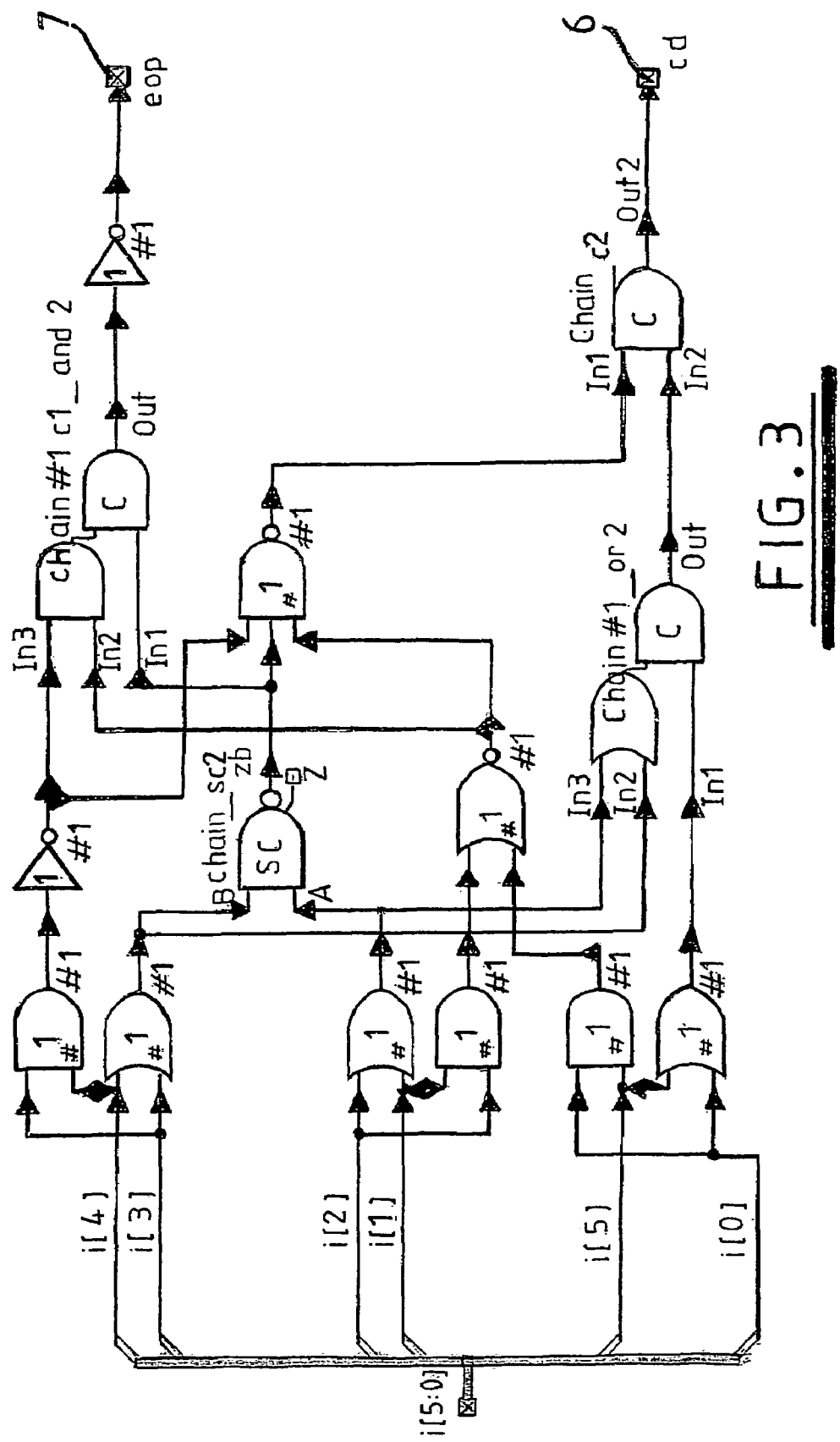
FIG. 3 is a circuit diagram showing completion detection logic for a six-bit binary number treated in accordance with the present invention.

It will be appreciated that data transmitted using this code will need to undergo a process of completion detection as described above. A suitable circuit for performing such completion detection is shown in FIG. 3. It should be noted that the circuit of FIG. 3 has two outputs 6, 7. A first output 6 indicates that the input value is a valid code representing a binary value, that is one of the codes shown in table 5. A second output 7 indicates that the data is a valid 3-of-6 code but not a valid binary value, that is one of the codes shown in the top four rows of table 6.

Figure 4:
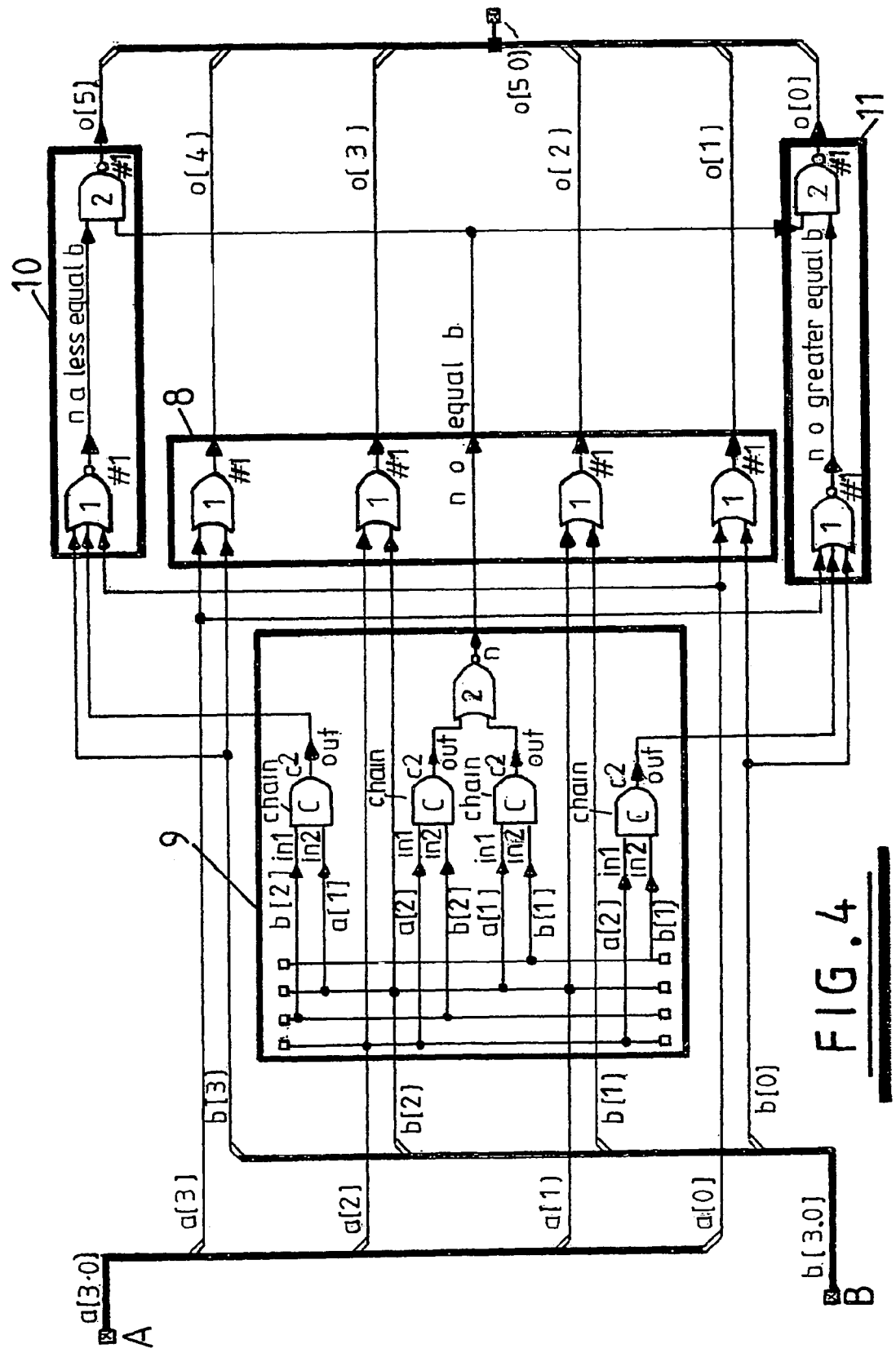
FIG. 4 is a circuit diagram showing encoding logic used in an embodiment of the present invention.

A process for encoding a four bit binary value as two 1-of-4 codes, and using these codes to generate a restricted 3-of-6 code as shown in table 5 has been described above. FIG. 4 shows a suitable circuit of logic gates for implementing the encoding of two 1-of-4 codes as a restricted 3-of-6 code. The construction of the circuit of FIG. 4 will be readily apparent to those skilled in the art, however it can be observed that a first part of the circuit 8 comprises 4 OR gates which generate the 4-bit component of the 3-of-6 code (the central four output wires of FIG. 4). The remaining gates within the circuits 9, 10, 11 together generate the two bit component of the 3-of-6 code (the uppermost and lowermost output wires in FIG. 4), by comparing the magnitude of the two codes A and B.

Figure 5:
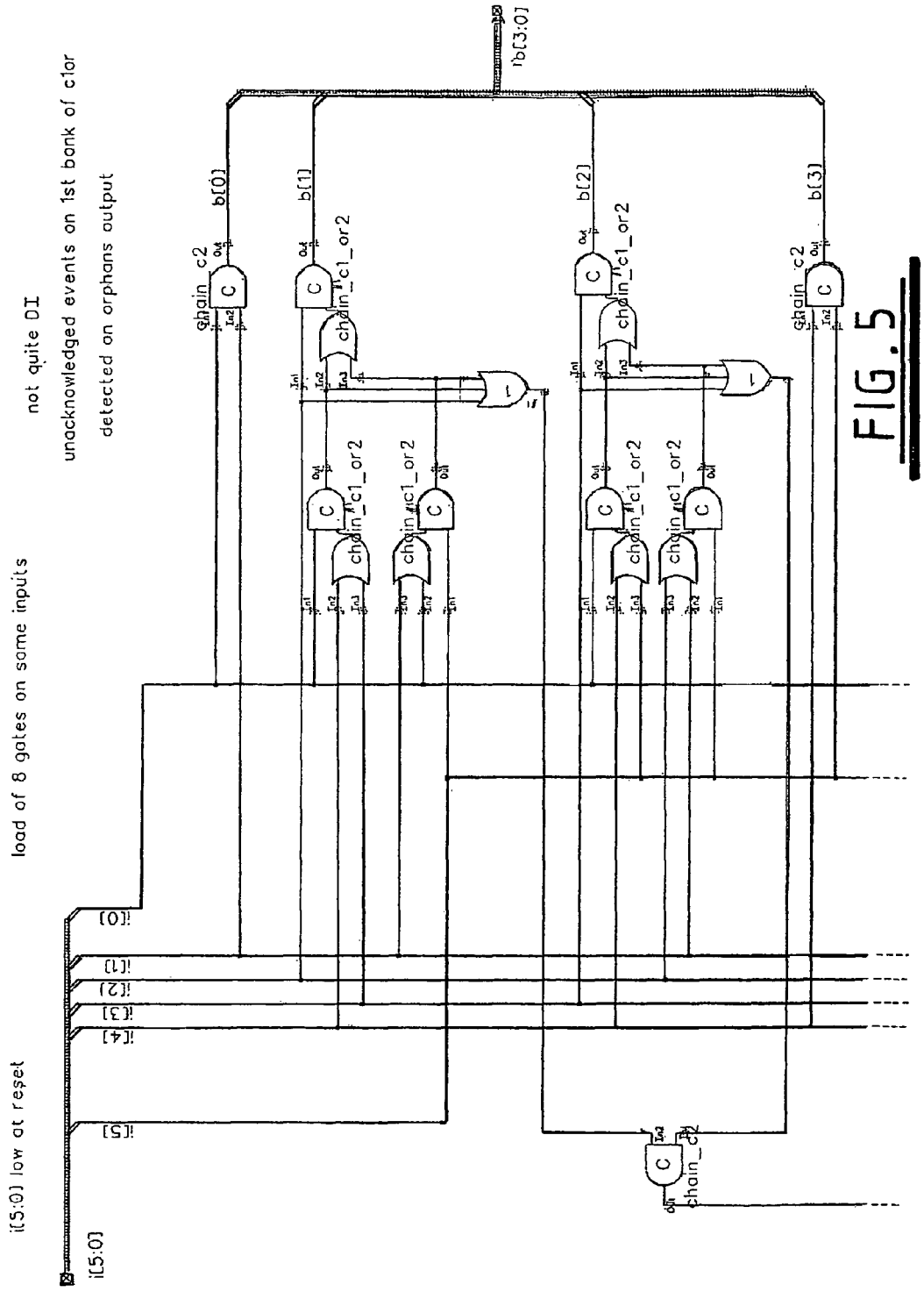
FIG. 5 is a circuit diagram showing decoding logic used in an embodiment of the present invention.
Figure 5:
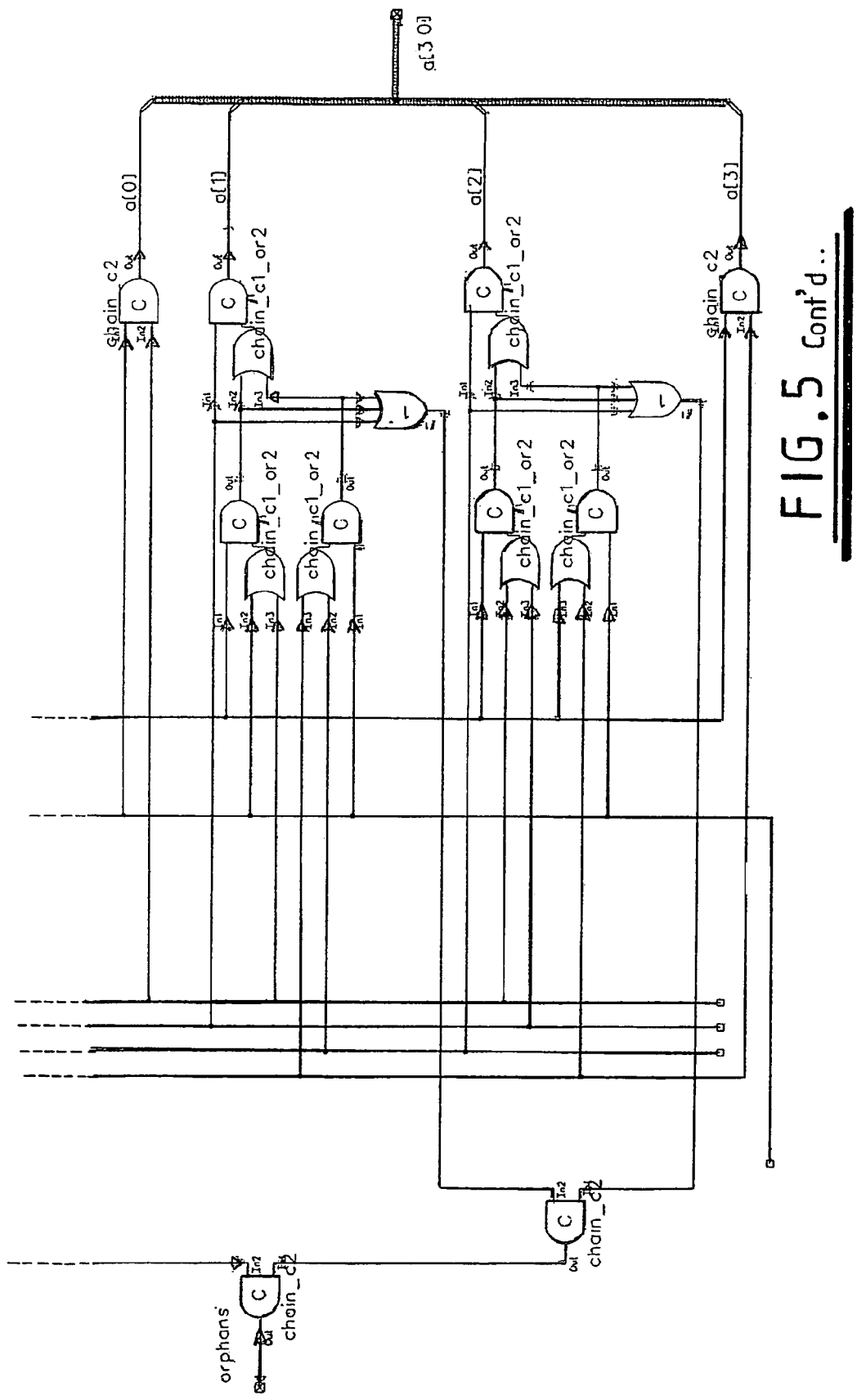

FIG. 5 shows a suitable circuit for performing the reverse operation, that is the decoding of the 3-of-6 code into two 1-of-4 codes.

It will be appreciated that other codes can be used in place of the 2-of-7 code and 3-of-6 code described above. Suitable example decompositions of such codes are shown in table 7.

TABLE 7

| Code | Component Codes | | | Useful Symbols Per Row | Total | Bits |
| --- | --- | --- | --- | --- | --- | --- |
| 2-of-5 | 1-of-2 | 1-of-2 | 0-of-1 | 2 × 2 × 1 | 8 | 3 |
| | 1-of-2 | 0-of-2 | 1-of-1 | 2 × 1 × 1 | | |
| | 0-of-2 | 1-of-2 | 1-of-1 | 2 × 1 × 1 | | |
| 2-of-7 | 1-of-3 | 1-of-2 | 0-of-2 | 3 × 2 × 1 | 16 | 4 |
| | 1-of-3 | 0-of-2 | 1-of-2 | 3 × 1 × 2 | | |
| | 0-of-3 | 1-of-2 | 1-of-2 | 1 × 2 × 2 | | |
| 3-of-6 | 2-of-2 | 1-of-4 | | 1 × 4 | 16 | 4 |
| | 1-of-2 | 2-of-4 | | 2 × 6 | | |
| 2-of-9 | 1-of-4 | 1-of-5 | | 4 × 5 | 32 | 5 |
| | 2-of-4 | 0-of-5 | | 6 × 1 | | |
| | 0-of-4 | 2-of-5 | | 1 × 6 | | |
| 3-of-7 | 2-of-3 | 1-of-4 | | 3 × 4 | 34 | 5 |
| | 1-of-3 | 2-of-4 | | 3 × 6 | | |
| | 0-of-3 | 3-of-4 | | 1 × 4 | | |
| 3-of-8 | 1-of-2 | 1-of-3 | 1-of-3 | 2 × 3 × 3 | 36 | 5 |
| | 0-of-2 | 2-of-3 | 1-of-3 | 1 × 3 × 3 | | |
| | 0-of-2 | 1-of-3 | 2-of-3 | 1 × 3 × 3 | | |
| 3-of-9 | 1-of-4 | 2-of-5* | | 4 × 8 | 66 | 6 |
| | 2-of-4 | 1-of-5 | | 6 × 5 | | |
| | 3-of-4 | 0-of-5 | | 4 × 1 | | |
| 4-of-8 | 3-of-4 | 1-of-4 | | 4 × 4 | 68 | 6 |
| | 2-of-4 | 2-of-4 | | 6 × 6 | | |
| | 1-of-4 | 3-of-4 | | 4 × 4 | | |
| 4-of-9 | 1-of-4 | 3-of-5* | | 4 × 8 | 80 | 6 |
| | 2-of-4 | 2-of-5* | | 6 × 8 | | |
| 5-of-11 | 2-of-4 | 2-of-4 | 1-of-3 | 6 × 6 × 3 | 268 | 8 |
| | 1-of-4 | 2-of-4 | 2-of-3 | 4 × 6 × 3 | | |
| | 2-of-4 | 1-of-4 | 2-of-3 | 6 × 4 × 3 | | |
| | 1-of-4 | 1-of-4 | 3-of-3 | 4 × 4 × 1 | | |
| 5-of-12 | 1-of-4 | 2-of-4 | 2-of-4 | 4 × 6 × 6 | 432 | 8 |
| | 2-of-4 | 1-of-4 | 2-of-4 | 6 × 4 × 6 | | |
| | 2-of-4 | 2-of-4 | 1-of-4 | 6 × 6 × 4 | | |

Where an entry in one the component columns is followed by an asterisk (*), this indicates that this component is itself decomposed in the manner shown in a previous row of the table. It will be appreciated that the components selected in the examples of Table 7 have been chosen so as to minimize logic complexity while maximizing the number of symbols that can be represented.

It will be appreciated that FIGS. 2 to 5 are included only as exemplary logic circuits. Those skilled in the art will realize that a number of alternative logic circuits may be used to realize the same function, and the design of such logic circuits will be well known to those skilled in the art.

The invention has been described in an embodiment using unidirectional communication between a sender and a receiver. It will be appreciated that in some embodiments of the invention communication may occur between transceivers, each having the capability to transmit and receive. For example, the method of the invention can be used in any suitable bi-directional communication method, including that described in the applicant's published PCT Patent Application No. PCT/GB00/03960.

What is claimed is:

1. A method for communication between a sender and a receiver comprising:
   receiving data in the form of an M-of-N code at the receiver, the M-of-N code comprising a first component of length $n_1$ and a second component of length $n_2$;
   decoding a portion of the data in which the first component is an $m_1$-of-$n_1$ code and the second component is an $m_2$-of-$n_2$ code; and
   decoding a portion of the data in which the first component is an $m_3$-of-$n_1$ code, where $m_1 \neq m_3$, and the second component is an $m_4$-of-$n_2$ code, where $m_2 \neq m_4$.

2. The method of claim 1, wherein $n_1+n_2=N$, and $m_1+m_2=m_3+m_4=M$.

3. The method of claim 1, wherein at least one of the first and second components comprising first and second sub-components, the method further comprising decoding data in which the first sub-component is a $p_1$-of-$q_1$ code and the second sub-component is a $p_2$-of-$q_2$ code, and for decoding data in which the first sub-component is a $p_3$-of-$q_1$ code, where $p_1 \neq p_3$, and the second sub-component is a $p_4$-of-$q_2$ code, where $p_2 \neq p_4$.

4. The method of claim 1, wherein the M-of-N code is an encoding of a binary value.

5. The method of claim 4, wherein the binary value is encoded by representing the binary value as a plurality of $m_1$-of-$n_1$ codes, the plurality of codes are input to a bitwise logical OR function, the output of the logical OR function is the first component of the M-of-N code, and the second component is determined based upon the difference, if any, between the plurality of $m_1$-of-$n_1$ codes.

6. The method of claim 5, wherein the binary value is represented as two $m_1$-of-$n_1$ codes, equality between the two $m_1$-of-$n_1$ codes results in the first component of the M-of-N code being an $m_1$-of-$n_1$ code and the second component of the M-of-N code being an $m_2$-of-$n_2$ code, and inequality between the two $m_1$-of-$n_1$ codes results in the first component of the binary number being an $m_3$-of-$n_1$ code and the second component of the binary number being an $m_4$-of-$n_2$ code.

7. The method of claim 1, wherein the sender and receiver are located within a single silicon chip.

8. The method of claim 1, wherein the sender and receiver are located on different silicon chips.

9. The method of claim 1, wherein a plurality of data items are transmitted by the sender to the receiver, and data is transmitted via a buffer positioned between the sender and the receiver, such that a first data item is transmitted from the buffer to the receiver while a second data item is transmitted from the sender to the buffer.

10. The method of claim 1, wherein at least one of $m_1$ and $m_2$ is 1.

11. A communications apparatus comprising a sender, a receiver and a transmission circuit at the sender for transmitting data in the form of a binary number representing an M-of-N code to the receiver, wherein the binary number is considered as comprising a first component of length $n_1$ and a second component of length $n_2$, and the receiver comprises a circuit for receiving and decoding data in which the first component is an $m_1$-of-$n_1$ code and the second component is an $m_2$-of-$n_2$ code, and a circuit for receiving and decoding data in which the first component is an $m_3$-of-$n_1$ code, where $m_1 \neq m_3$, and the second component is an $m_4$-of-$n_2$ code, where $m_2 \neq m_4$.

12. An apparatus for communication between a sender and a receiver, comprising:
   means for receiving data in the form of an M-of-N code at the receiver, the M-of-N code comprising a first component of length $n_1$ and a second component of length $n_2$;
   means for decoding a portion of the data in which the first component is an $m_1$-of-$n_1$ code and the second component is an $m_2$-of-$n_2$ code; and
   means for decoding a portion of the data in which the first component is an $m_3$-of-$n_1$ code, where $m_1 \neq m_3$, and the second component is an $m_4$-of-$n_2$ code, where $m_2 \neq m_4$.

13. A computer-readable medium having instructions stored thereon, which when executed by a processor, will cause the processor to implement a method of communication between a sender and a receiver, the method comprising:
   receiving data in the form of an M-of-N code at the receiver, the M-of-N code comprising a first component of length $n_1$ and a second component of length $n_2$;
   decoding a portion of the data in which the first component is an $m_1$-of-$n_1$ code and the second component is an $m_2$-of-$n_2$ code; and
   decoding a portion of the data in which the first component is an $m_3$-of-$n_1$ code, where $m_1 \neq m_3$, and the second component is an $m_4$-of-$n_2$ code, where $m_2 \neq m_4$.

14. A method for communication between a sender and a receiver, wherein:
   the sender transmits data in the form of an M-of-N code to the receiver;
   the M-of-N code is considered as comprising a first component of length $n_1$ and a second component of length $n_2$; and
   the receiver is provided with means for decoding data in which the first component is an $m_1$-of-$n_1$ code and the second component is an $m_2$-of-$n_2$ code, and for decoding data in which the first component is an $m_3$-of-$n_1$ code where $m_1 \neq m_3$ and the second component is an $m_4$of-$n_2$ code where $m_2 \neq m_4$.

* * * * *